United States Patent [19]
Farley

[11] Patent Number: 5,394,906
[45] Date of Patent: Mar. 7, 1995

[54] METHOD AND APPARATUS FOR WEAVING CURVED MATERIAL PREFORMS

[75] Inventor: Gary L. Farley, Yorktown, Va.

[73] Assignee: The United States of America as represented by the Administrator of the National Aeronautics and Space Administration, Washington, D.C.

[21] Appl. No.: 17,205

[22] Filed: Feb. 10, 1993

[51] Int. Cl.6 .................. D03D 3/08; D03D 41/00
[52] U.S. Cl. ........................ 139/192; 139/11; 139/384 R; 139/305; 428/175
[58] Field of Search ............ 139/11, DIG. 1, 384 R, 139/192, 305, 186 A; 428/175

[56] References Cited

U.S. PATENT DOCUMENTS

| | | | |
|---|---|---|---|
| 1,319,819 | 10/1919 | Williams | 139/305 |
| 1,409,892 | 3/1922 | Clark et al. | 139/305 |
| 2,705,977 | 4/1955 | Matthews | 139/192 |
| 3,016,068 | 1/1962 | Felix | 139/48 X |
| 3,132,671 | 5/1964 | Koppelman et al. | 139/11 |
| 4,922,968 | 5/1990 | Bottger et al. | 139/384 R |
| 4,949,761 | 8/1990 | Fleury et al. | 139/384 R |
| 5,029,616 | 7/1991 | Deconnick | 139/25 |

FOREIGN PATENT DOCUMENTS

| | | | |
|---|---|---|---|
| 17797 | 5/1882 | Germany | 139/305 |
| 51-84974 | 7/1976 | Japan | 139/305 |
| 299624 | 11/1928 | United Kingdom | 139/305 |

*Primary Examiner*—Andrew M. Falik
*Attorney, Agent, or Firm*—Linda B. B. Blackburn

[57] ABSTRACT

A method and apparatus for fabricating straight or curved planar or three-dimensional (C channel, for example) fabric for fabrication into composite structures. In the first embodiment, the fill yarns are inserted between layers of warp yarns, and a canted or curved reed, depending on the desired orientation of the fill yarns, is used to compact or "beat-up" the fill yarns. In the second embodiment, the warp yarns of the fabric are curved using a conical or a combination of conical and cylindrical rollers to effect differential fabric take-up of the warp yarns for obtaining a constant radius of curvature of the warp yarns. In a third embodiment, a clamping bar fabric take-up device is used to effect the differential fabric take-up of the warp yarns for obtaining straight warp yarns, curved warp yarns with a constant radius of curvature, curved warp yarns with a non-constant radius of curvature, or some combination of straight and curved warp yarns. In a fourth embodiment, for forming the flanges of the curved C channel, the warp yarns are alternately inserted through adjacent dent wires of the reed to permit vertical weaving of the flanges.

25 Claims, 3 Drawing Sheets

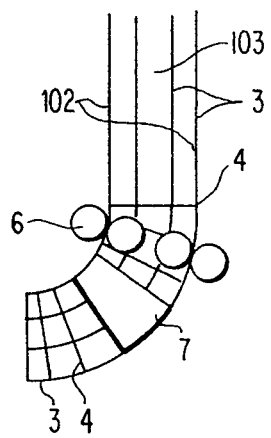
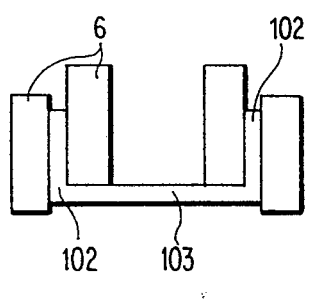
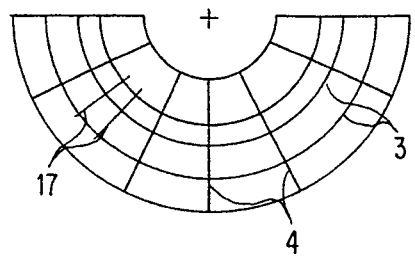
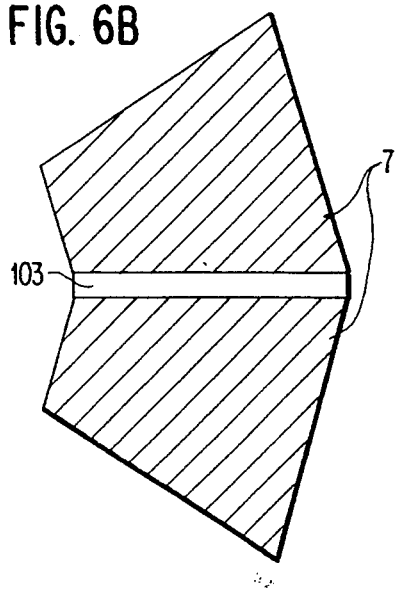
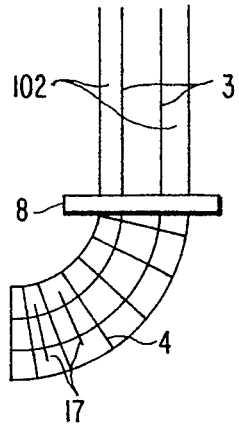
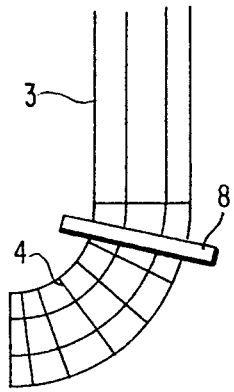

METHOD AND APPARATUS FOR WEAVING CURVED MATERIAL PREFORMS

ORIGIN OF THE INVENTION

The invention described herein was made by an employee of the United States Government and may be used by or for the Government for governmental purposes without the payment of royalties thereon or therefor.

BACKGROUND OF THE INVENTION

1. Field of the Invention

The present invention is directed to a method and apparatus for facilitating the fabrication of new textile material preforms for fabrication into composite structures. In particular, the invention is directed to a method and apparatus for fabricating planar curved frame preforms that are later processed into a composite structure.

2. Description of the Background Art

Structural parts fabricated from composite materials are produced in a variety of methods: 1) hand layed-up prepreg; 2) filament winding; 3) tow placement and 4) dry fiber preforms (woven, braided and knitted).

No single fabrication method has proven optimal for all structures. One of the most complicated structures to fabricate from composite materials into a structurally efficient and cost effective part is a curved frame, such as the curved I-beam 200 in FIG. 1.

The difficulties in fabricating a curved frame, such as shown in FIG. 1, are: 1) maintaining the desired fiber orientation along the curved section; 2) uniform material coverage from inner to outer radial points along the curved section; 3) producing the required cross-sectional geometry and 4) cost.

The web 103 of a curved I-beam 200, for many applications, may have its fibers oriented in a + and − 45 degree direction relative to the circumferential axis (dotted line in FIG. 1). However, for other applications, the fiber angles in the web may need to vary as a function of circumferential position.

The above noted fabrication techniques have several drawbacks, as described below.

Hand lay up of tape or fabric prepreg is difficult and in many cases impossible to perform for a curved frame where control of fiber angle and material uniformity is critical. Considerable amount of cutting and darting of prepreg and the assembling of small pieces of prepreg are required to form the different elements of a curved frame. This process is labor intensive and the mechanical properties of the assembled elements are significantly below the theoretical values.

Filament winding is a continuous fiber placement technique whereby fibers are wrapped around a mandrel. This fabrication technique is not applicable to all geometrical shapes. For example, fiber bridging occurs along surfaces that have concave shapes. Furthermore, it is impossible to obtain a uniform coverage of material in a curved section using filament winding. Although filament winding is a highly automated technology, filament winding a complex shape multi-layer laminate can require considerable time due to the low material dispensing rate.

Tow placement is a technology similar to filament winding in that single/multiple tows or ribbons of material are dispensed onto a mandrel. Unlike filament winding, the tows can be discontinuous in length and tows can be placed along concave surfaces. Using discontinuous tows, it is possible to obtain near uniform coverage of material across a curved part and it is possible to maintain the desired fiber angle. However, the process can be slow and restricted to preimpregnated materials, and therefore expensive.

Weaving is a highly automated textile process for making dry fiber preforms. However, it is not currently possible to produce the unique fiber orientations and curved portion of the curved frame.

There are two types of braiding, 2-D and 3-D. In 2-D braiding a preform can be made whereby layers of dry fibers are braided around a mandrel. This fabrication method is limited to braiding around mandrels with convex surfaces. Concave sections of the mandrel's surface may produce fiber bridging. Another disadvantage of this method is the lack of uniform fiber coverage along the circumference of the section similar to that found in filament wound curved frames. Also, it is difficult to accommodate changes in fiber angle along the circumference while maintaining a uniform layer thickness.

It is conceptually possible, utilizing 3-D braiding, to fabricate a net-shape preform of a curved frame without braiding over a mandrel. Unfortunately, this technology has not significantly matured, and braiding time per pound of material is significant. Utilizing current 3-D braiding methods, the fiber architecture is highly crimped resulting in reduced mechanical properties.

Knitting is a high speed textile process that can be used to produce many complicated shapes. However, the knitting process creates an open structure resulting in a low fiber volume fraction and reduced mechanical properties. Because of these deficiencies, this technology has not been extensively exploited for application to composite structural preforms.

To facilitate the description of the important features of the present invention, the construction of a curved frame having an I cross-sectional shape will be described with respect to FIGS. 1 and 2.

If the I cross-sectional curved frame 100 was fabricated from prepreg or tow placement, it may be assembled as a set of nested C channels 101 with caps 102, as depicted in FIG. 2. The ideal fiber orientation of the web of the C channels 101 is generally + or − 45 degrees relative to the circumferential axis of the web 103 of the frame (See FIG. 1). The caps 102 contain a high percentage of 0 degree fibers with some 90 and possibly some + and − 45 degree fibers.

SUMMARY OF THE INVENTION

It is an object of the present invention to provide a method and apparatus for producing fabric that duplicates the above described construction, while maintaining the appropriate fiber orientation, overall geometry and uniformity of layer thickness. The proposed invention is not, however, limited to this particular cross-sectional geometry or the + or − 45 degree fiber orientation. In fact, the fiber angle can be specified as a function of position along the beam, and the width of the fabric can change along the length of the part.

Another object of the present invention is to facilitate the fabrication of a broad range of preforms that can be used to make less expensive, structurally efficient composite structural parts that have previously been expensive, structurally inefficient and unfabricable.

In the first embodiment of the present invention, the fill yarns for a material preform are inserted through the warp yarns at a predetermined angle. The reed is canted at a predetermined angle or curved, and the reed dent wires are moved in a direction parallel to the warp yarns until the reed dent wires and the reed map out the desired orientation or shape of the fill yarn. See FIGS. 3A and 3B which show a conventional reed 1 and a canted reed 60 of the first embodiment of the present invention. FIG. 4 shows a curved reed 70 of the first embodiment of the present invention.

The second embodiment is directed to a method and apparatus for curving the C channel while maintaining the appropriate fill yarn orientation according to the above described first embodiment. This is accomplished by modifying the fabric take-up system. In particular, the fabric is woven using a differential fabric take-up system such as the conical and cylindrical rollers shown in FIGS. 5A, 5B, 6A and 6B and the clamping bars depicted in FIGS. 7A and 7B. The smaller diameter portion of the conical rollers pull the warp yarns (i.e., fabric) less per roller revolution than the larger diameter portion of the roller. This differential take-up of the warp yarns causes the fabric to curve. Uniform diameter (cylindrical) rollers 6 are used along the flanges of the curved C channel since the flanges have the same length warp yarns throughout.

In a third embodiment, particularly suited for fabricating curved C channels with a changing radius of curvature, a clamping bar arrangement with differential take-up at each end of the bar is employed as shown in FIGS. 7A, 7B, 8A and 8B.

If either the roller take-up system shown in FIGS. 5A and 5B or the clamping system shown in FIGS. 8A and 8B are used, the reed dent wires may be arranged to extend vertically, i.e., parallel to the curved C channel's flanges, for weaving the flanges vertically. However, if all the warp yarns in the flange are in the same reed dent wire, then it is not possible to beat-up the fill yarn into the fabric. In a fourth embodiment of the present invention, the warp yarns for the flange portions of the C channel are alternately inserted through adjacent reed dent wires, as shown in FIG. 9. This allows the flanges to be weaved vertically with the same fill yarn used to weave the web portion of the C channel.

BRIEF DESCRIPTION OF THE DRAWINGS

FIG. 5A is a cross sectional view and FIG. 5B is a top plan view of a cylindrical roller fabric take-up system according to a second embodiment of the present invention;

FIG. 6A is a top plan view and FIG. 6B is a cross sectional view of the conical roller fabric take-up system according to the second embodiment of the present invention;

FIGS. 7A and 7B are top plan view of a clamping bar fabric take-up device according to a third embodiment of the present invention;

DETAILED DESCRIPTION OF THE PREFERRED EMBODIMENTS

Figure 1:
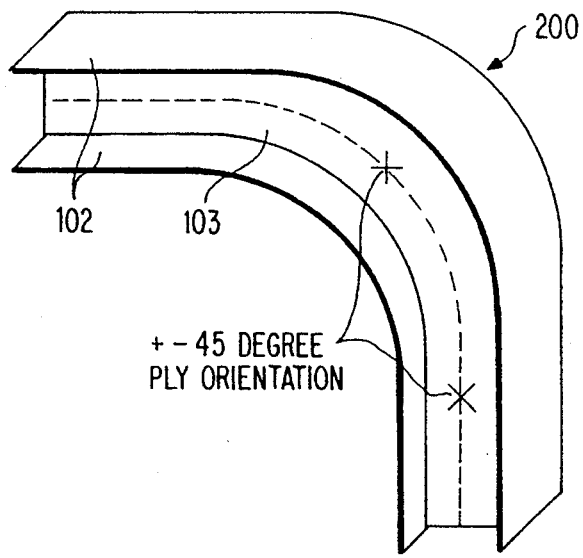
FIG. 1 is a perspective view of a prior curved frame having an I cross section.
Figure 2:
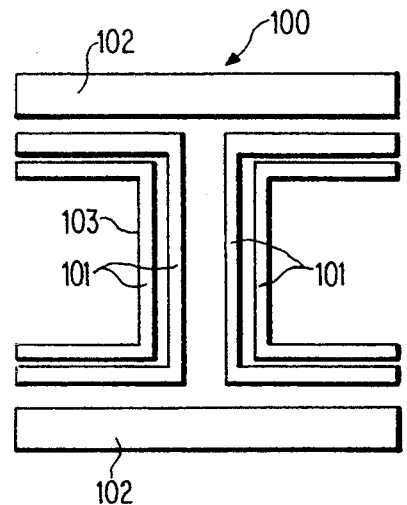
FIG. 2 is a cross sectional view of a prior frame having an I cross section showing a series of nested C channels with a cap.
Figure 3A:
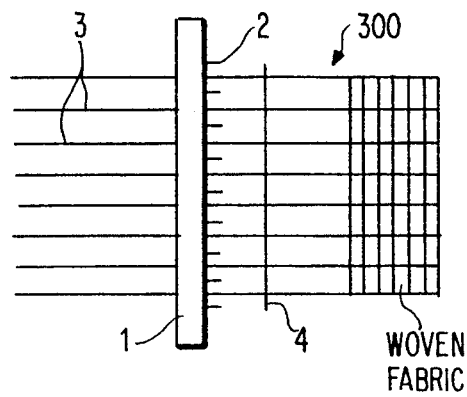
FIG. 3A is a top plan view showing a conventional reed and woven fabric and FIG. 3B is a top plan view of a canted reed and its woven fabric of the first embodiment of the present invention.
Figure 3B:
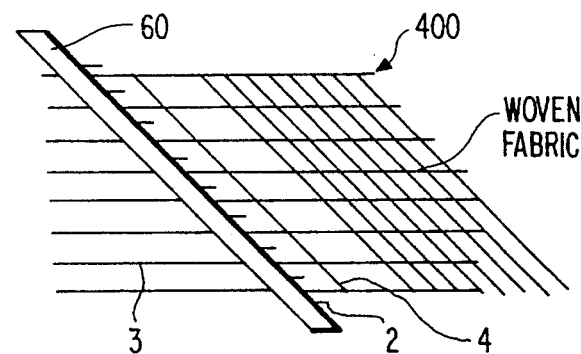
Figure 4:
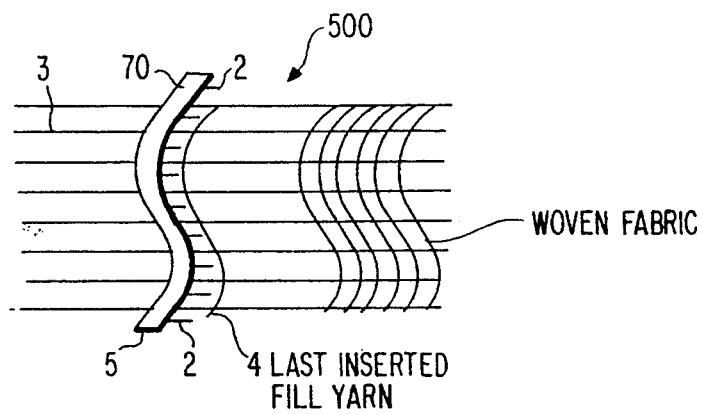
FIG. 4 is a top plan view of a curved reed of the first embodiment of the present invention.

FIG. 3A shows a conventional loom 300 with a straight reed 1, and FIG. 3B shows a canted reed loom 400 of the first embodiment of the present invention with a canted reed 60. FIG. 4 shows a curved reed loom 500 of the first embodiment with a curved reed 70.

The fill yarns 4 are inserted (by hand, machine or in any other manner) in the loom 400 of the present invention, and the canted reed 60 having a series of dent wires 2 is used to beat-up the fill yarns 4 into a tightly woven fabric having the desired fiber orientation.

The canted reed 60 may be designed to effect almost any desired fiber orientation. For example, in loom 500, such as shown in FIG. 4, the reed is an S-shaped reed 70. The reed may, however, be curved in any desired shape. Again, the curved reed 70 is moved parallel with the warp yarns 3 to beat-up the fill yarns 4 into a tightly woven fabric having the desired fiber orientation, in this example, a curved S-shape. Also, the reed may change shape during the weaving process.

FIGS. 5A, 5B, 6A and 6B are directed to a second embodiment of the present invention in which conical take-up rollers 7 are used to form the web portion 103 of the C channel. The warp yarns 3 are pulled between two adjacent conical take-up rollers 7 (FIG. 6B) such that the warp yarns 3 which are taken up by the smaller diameter portion of the conical roller 7 are pulled a shorter distance than the warp yarns 3 which are taken up by the larger diameter portion of the conical roller. This differential take-up of the warp yarns 3 causes the fabric to curve, as shown in FIGS. 5A and 6A. The fill yarns 4 can then be woven at the desired orientation according to the above described first embodiment.

The flanges 102 of the C channel are taken up by uniform diameter cylindrical take-up rollers 6, as shown in FIG. 5A. This is because the warp yarns in a flange 102 all have the same length. That is, the warp yarns 3 at the corner of the web portion and the flanges are the same length as the warp yarns 3 at a tip end of the flanges. In other words, the warp yarns 3 of the flanges all have the same radius of curvature. Accordingly, as shown in FIGS. 5A and 5B, the flanges can be formed using uniform diameter (cylindrical) take-up rollers 6. Thus, the fabric take-up system shown in FIGS. 5A, 5B, 6A and 6B combines uniform diameter (cylindrical) take-up rollers 6 and conical rollers 7.

One disadvantage of using rollers as described above is when a change in the radius of curvature of the C channel is desired. That is, it is difficult to vary the diameter of the conical rollers during the weaving process so as to form a non-constant radius of curvature. It is also difficult to change the length of the conical roller. The third embodiment is directed to solving such a problem.

Figure 8A:
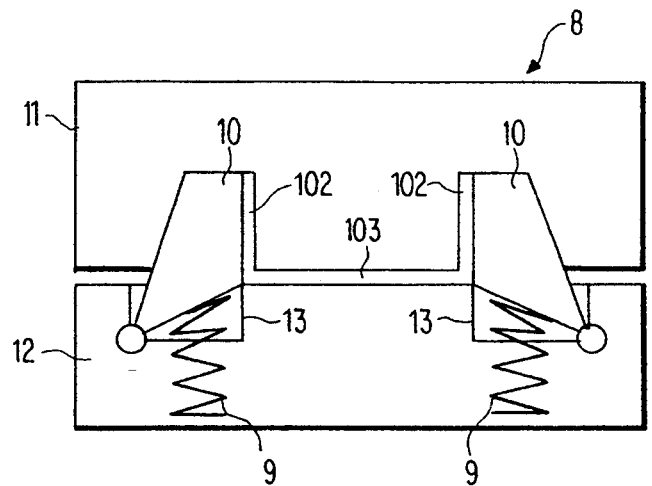
FIGS. 8A and 8B are cross sectional views of another clamping bar fabric take-up device of the third embodiment of the present invention.
Figure 8B:
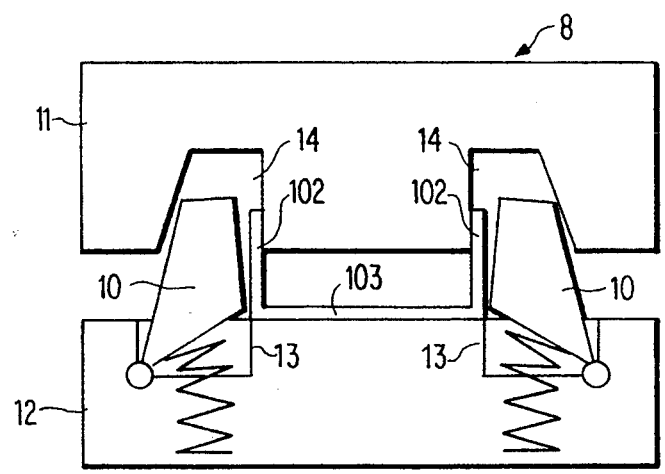

In the third embodiment (FIGS. 7A, 7B, 8A and 8B), a clamping bar 8 is used to effect differential take-up of the warp yarns 3, as in the previous embodiment. As shown in FIGS. 8A and 8B, the clamping bar 8 has an upper block 11 and a lower block 12. Chucks 10, 10 are pivotally secured within recesses 13, 13 formed in the lower block 12, and springs 9, 9 are positioned in the lower block 12 below the chucks 10, 10 to bias the chucks upwardly and outwardly, i.e., out of the recesses 13, 13. The upper block 11 is also provided with recesses 14, 14 which receive the chucks 10, 10 as well as the fabric flanges 102, 102 of the C channel., The web portion 103 of the C channel is positioned between the upper and lower blocks, 11, 12 and between the recesses 14, 14 and 13, 13, so that the cross sectional geometry of the C channel approximates that between the upper block 11 and the lower block 12 when the blocks 11, 12 are pressed together. When the upper block 11 is pushed down against the lower block 12, the chucks 10, 10 are forced downwardly and inwardly against the force of the springs 9, 9, and the flanges 102, 102 and the web portion 103 of the C channel are clamped so as to resist a pulling force on the warp yarns. In order to produce curvature within the C channel, one edge of the clamping blocks 11, 12 are pulled further than the other edge. The fill yarns 4 can then be woven according to the above described first embodiment.

Utilizing either take-up system (i.e., the take-up system of the second or third embodiments), the distance between the fill yarns 4 at the outer radius of the curved C channel is always greater than the distance between the fill yarns 4 at the inner radius of the curved C channel. Intermediate fill yarns 17 (see FIGS. 6A and 7A) that do not extend all the way from the inner to the outer edges of the C channel may be woven between the warp yarns 3 parallel with the fill yarns 4 to provide a more uniform thickness distribution of the fabric.

Figure 9:
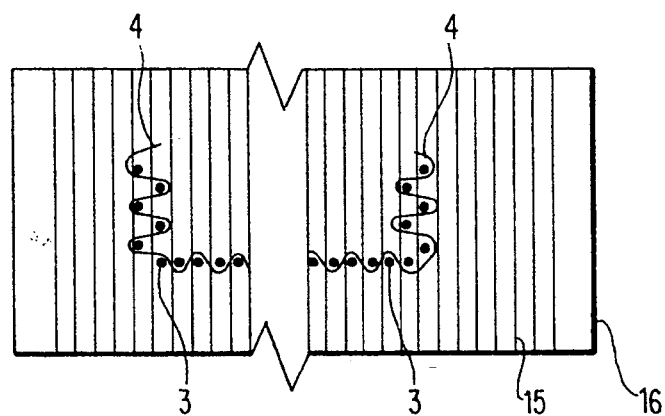
FIG. 9 is a cross sectional view of the location of the fill yarns and warp yarns relative to a reed and according to a fourth embodiment of the present invention.

Weaving the flanges of a straight C channel can be accomplished using conventional multilayer fabric weaving techniques. However, when the fabric is curved and the radius of curvature of the flange is constant, this conventional multilayer weaving technique will not work. An alternative approach is to weave the flanges vertically, as shown in FIG. 9. However, if all of the warp yarns 3 in the flanges 102, 102 of the C channel extend through the same adjacent dent wires 15 of the reed frame 16, then it is not possible to beat-up the fill yarn 4 into the fabric.

The fourth embodiment (FIG. 9) is directed to solving such a problem. In particular, in the fourth embodiment, the warp yarns 3 are inserted through adjacent dents in an alternating fashion. In this manner, the reed dent wire or wires 15 which extend between the adjacent warp yarns contact the fill yarn 4 and push or beat-up the fill yarn 4 to achieve a tightly compacted material preform.

While the invention has been particularly shown and described with reference to preferred embodiments thereof, it will be understood by those skilled in the art that the foregoing and other changes in form and details may be made therein without departing from the spirit and scope of the invention.

I claim:

1. A method for fabricating a three-dimensional fabric having a c-shaped cross section with a web and flange that can be formed into a preform, from a plurality of warp yarns and a plurality of interwoven fill yarns, comprising:

performing differential fabric take-up of the warp yarns from one side edge of the fabric web to an opposite side edge to create curved warp yarns for imparting a flat curved configuration to the web portion;

performing uniform fabric take-up of the warp yarns from one side edge of the fabric flange to an opposite side edge to create curved flanges;

compacting the fill yarns at a desired orientation with a reed having a plurality of dent wires and having a profile corresponding to the desired orientation of the fill yarns; and arranging the warp yarns in the flanges so that he warp yarns are alternately inserted through adjacent dent wires of the reed.

2. A method for fabricating a three-dimensional fabric according to claim 1, further comprising the step of: inserting one or more intermediate length fill yarns between adjacent fill yarns.

3. A method for fabricating a three-dimensional fabric according to claim 1, wherein the differential fabric take-up step is performed using a pair of opposed conical rollers to obtain a constant radius of curvature of the warp yarns.

4. A method for fabricating a three-dimensional fabric according to claim 1, wherein the differential fabric take-up step is performed using a clamping bar take-up device to obtain curved warp yarns.

5. A method for fabricating a three-dimensional fabric according to claim 1, wherein the fill yarns are inserted into the warp yarns at angles approximating the desired orientation prior to the compacting step.

6. A method for fabricating a three-dimensional fabric according to claim 1, wherein the compacting step is performed using a canted reed.

7. A method for fabricating a three-dimensional fabric according to claim 1, wherein the compacting step is performed using a curved reed.

8. A method for fabricating a three-dimensional fabric according to claim 1, wherein the compacting step is performed using an S-shaped reed.

9. An apparatus for fabricating a three-dimensional fabric having a c-shaped cross section with a web and flange that can be formed into a preform, from a plurality of warp yarns and a plurality of interwoven fill yarns, comprising:

means for performing differential fabric take-up of the warp yarns from one side edge of the fabric web to an opposite side edge to create curved warp yarns for imparting a flat curved configuration to the web portion;

means for performing uniform fabric take-up of the warp yarns from one side edge of the fabric flange to an opposite side edge to create curved flanges;

means for compacting the fill yarns at a desired orientation with a reed having a plurality of dent wires and having a profile corresponding to the desired orientation of the fill yarns; and means for arranging the warp yarns in the flanges so that the warp yarns are alternately inserted through adjacent dent wires of the reed.

10. An apparatus for fabricating a three-dimensional fabric according to claim 9, wherein said means for performing differential fabric take-up of the warp yarns comprises a pair of opposed conical rollers for obtaining a constant radius of curvature of the warp yarns.

11. A apparatus for fabricating a three-dimensional fabric according to claim 9, wherein said means for performing differential fabric take-up step of the warp yarns comprises a clamping bar take-up device to obtain curved warp yarns.

12. An apparatus for fabricating a three-dimensional fabric according to claim 9, wherein said clamping bar take-up device for obtaining a non-constant radius of curvature of the warp yarns comprises:

an upper block and a lower block for clamping the planar or web portion of a three-dimensional C-shaped channel fabric and the flanges of the material preform there between, the flanges being received in recesses formed in the upper block;

a pair of chucks pivotally secured within recesses formed in said lower block and extending into the recesses formed in said upper block; and a pair of springs secured at opposite ends thereof to said lower block and said chucks for biasing said chucks upwardly and outwardly from said recesses formed in said lower block so as to release the flanges of the material preform, wherein said upper block is clamped over said lower block to clamp the web portion there between and to force said chucks against the biasing force of said springs and against the flanges and upper block, and wherein one side of the clamping blocks is pulled further than the opposite side producing curvature in the fabric, and wherein when the amount the sides of the clamping blocks are pulled changes, then the radius of curvature of the fabric changes producing a non-constant radius of curvature.

13. An apparatus for fabricating a three-dimensional fabric according to claim 9, wherein the reed is a canted reed.

14. An apparatus for fabricating a three-dimensional fabric according to claim 9, wherein the reed is a curved reed.

15. An apparatus for fabricating a three-dimensional fabric according to claim 9, wherein the reed is an S-shaped reed.

16. A method for fabricating a curved flat fabric from a plurality of warp yarns and a plurality of interwoven fill yarns comprising:

clamping the warp yarns with a clamping bar take-up device;

performing differential fabric take-up of the warp yarns from one side edge of the fabric to an opposite side edge to create curved warp yarns for imparting a flat curved configuration to the fabric; and compacting the fill yarns at a desired orientation with a reed having a plurality of dent wires and having a profile corresponding to the desired orientation of the fill yarns.

17. A method for fabricating a curved, flat fabric as set forth in claim 16, further comprising the step of:

inserting one or more intermediate length fill yarns between adjacent fill yarns.

18. A method for fabricating a curved, flat fabric as set forth in claim 16, wherein the compacting step is performed using a canted reed.

19. A method for fabricating a curved, flat fabric according to claim 16, wherein the compacting step is performed using a curved reed.

20. A method for fabricating a curved, flat fabric according to claim 16, wherein the compacting step is performed using an S-shaped reed.

21. An apparatus for fabricating a curved flat fabric from a plurality of warp yarns and a plurality of interwoven fill yarns comprising:

means for performing differential fabric take-up of the warp yarns from one side edge of the fabric to an opposite side edge to create curved warp yarns for imparting a flat curved configuration to the fabric; and means for compacting the fill yarns at a desired orientation including a reed having a plurality of dent wires and having a profile corresponding to the desired orientation of the fill yarns;

wherein said means for performing differential fabric take-up step of the warp yarns comprises a clamping bar take-up device to obtain curved warp yarns.

22. An apparatus for fabricating a curved, flat fabric according to claim 21, wherein the reed is a canted reed.

23. An apparatus for fabricating a curved flat fabric according to claim 21, wherein the reed is a curved reed.

24. An apparatus for fabricating a curved, flat fabric according to claim 21, wherein the reed is an S-shaped reed.

25. An apparatus for fabricating a curved, flat fabric according to claim 21, wherein said clamping bar take-up device for obtaining a non-constant radius of curvature of the warp yarns comprises:

an upper block and a lower block-for clamping the planar or web portion of a three-dimensional C-shaped channel fabric and the flanges of the fabric there between, the flanges being received in recesses formed in the upper block;

a pair of chucks pivotally secured within recesses formed in said lower block and extending into the recesses formed in said upper block; and a pair of springs secured at opposite ends thereof to said lower block and said chucks for biasing said chucks upwardly and outwardly from said recesses formed in said lower block so as to release the flanges of the material preform, wherein said upper block is clamped over said lower block to clamp the web portion there between and to force said chucks against the biasing force of said springs and against the flanges and upper block, and wherein one side of the clamping blocks is pulled further than the opposite side producing curvature in the fabric, and wherein when the amount the sides of the clamping blocks are pulled changes, then the radius of curvature of the fabric changes producing a non-constant radius of curvature.

* * * * *